United States Patent [19]
Fimoff et al.

[11] Patent Number: 5,563,884
[45] Date of Patent: Oct. 8, 1996

[54] REDUCING MULTIPLEX JITTER IN AN ATM/MPEG SYSTEM

[75] Inventors: Mark Fimoff, Hoffman Estates; Ronald B. Lee, Northbrook, both of Ill.

[73] Assignee: Zenith Electronics Corporation, Glenview, Ill.

[21] Appl. No.: 411,000

[22] Filed: Mar. 27, 1995

[51] Int. Cl.$^6$ ............................................ H04N 7/24
[52] U.S. Cl. .................... 370/84; 370/85.6; 370/94.2; 370/99; 348/6; 348/497; 375/371
[58] Field of Search ............................. 348/6, 10, 472, 348/497; 370/60.1, 84, 85.6, 94.2, 99, 105.3; 340/825.5, 825.51; 455/6.1; 375/371

[56] References Cited

U.S. PATENT DOCUMENTS

| | | | |
|---|---|---|---|
| 5,150,358 | 9/1992 | Punj et al. | 370/84 |
| 5,159,452 | 10/1992 | Kinoshita et al. | 370/94.1 X |
| 5,287,182 | 2/1994 | Haskell et al. | 348/484 X |
| 5,371,532 | 12/1994 | Gelman et al. | 348/7 |
| 5,398,073 | 3/1995 | Wei | 348/487 |
| 5,467,342 | 11/1995 | Logston et al. | 370/17 |

*Primary Examiner*—Douglas W. Olms
*Assistant Examiner*—Russell W. Blum

[57] ABSTRACT

An ATM/MPEG system receives individual MPEG programs of different constant bit rates from a plurality of servers. The individual programs are converted into ATM cells which are transmitted along an ATM network at a constant bit rate. The ATM cells are received and arranged into queues of the individual programs. A microprocessor prioritizes the queues based upon the bit rates of the MPEG programs. The queues are multiplexed to 16 VSB modulators based upon their priority assignments with the highest priority queues being sent to the modulators in preference to lower priority queues.

12 Claims, 4 Drawing Sheets

REDUCING MULTIPLEX JITTER IN AN ATM/MPEG SYSTEM

BACKGROUND OF THE INVENTION AND PRIOR ART

This invention relates generally to data transmission systems and specifically to a data transmission system for transmitting MPEG (Motion Picture Experts Group) data along an ATM (Asynchronous Transfer Mode) network such as those used by telephone companies. The MPEG information is provided by one or more servers that deliver complete MPEG 2 type programs of constant data rate, that is comprising a fixed number of megabits per second. Although fixed for any given program, the data rates may differ depending upon the program. The ATM network, on the other hand, transmits at a constant data rate and utilizes data packets that differ from the MPEG data packets. Conversion from the MPEG format to the ATM cells and multiplexing of the ATM cell information from the plurality of servers are involved. The system chosen for purposes of description delivers MPEG 2 data to 16 VSB (vestigial sideband) modulators in a cable plant. The servers may be situated at different locations with their bit rates ranging from 0 to 15 megabits per second. The bit rate for each server is constant (for a given program). The disclosed system shows a 155 megabits per second constant ATM bit rate feeding four 16 VSB format modulators. One hundred and twenty eight servers are indicated although this number is arbitrary.

Data sent through an ATM system will incur a non-constant delay. Thus, for example, a series of ATM cells spaced 100 microseconds apart when they enter the ATM network, will be spaced 50, 67, 2, 200 etc. microseconds apart when they exit the ATM network. This variation is called "jitter".

As mentioned, the ATM system formats the MPEG 2 data into ATM cells via a series of N MPEG to ATM converters (MTA) and multiplexes the ATM cells during transmission. Each pair of MPEG 2 packet is converted into eight ATM cells which form an ATM packet. The ATM network guarantees that the cells from each server will remain in their original order although the cells will be intermixed with cells from other servers. The data from the ATM network is received by an ATM interface module (AIM) and supplied to an MPEG processing module (MPM) which reconverts the ATM protocol to MPEG protocol. The conversion is made by writing the ATM cells to one of N queues with an individual queue being provided for each server or program. The queues output the two original MPEG data packets that make up each ATM packet. These output MPEG packets are multiplexed under the control of a microprocessor and applied to an MPEG packet router which delivers the MPEG packets to one of four buffers that in turn supply the information to corresponding ones of four 16 VSB modulators. Each modulator (which corresponds to a cable transmission plant or site) supplies a number of set top boxes (STBs) which are built into or associated with individual receivers such as television receivers. Each set top box includes a 16 VSB demodulator, an MPEG transport chip, a rate buffer and an MPEG video/audio decoder. The decoder feeds a receiver.

A difficulty arises due to the problem of jitter and in particular the problem that jitter has on programs requiring a higher bit rate. The problem is concerned with the FIFO format of the queues. It is presently contemplated that as the final cell of an ATM packet (two MPEG data packets) is received in a queue, that pair of MPEG packets is ready to be multiplexed and sent to the packet router. After the pair of MPEG packets is sent out, the next completed group of two MPEG data packets is sent out, and so forth. The arrangement magnifies the jitter. As will be shown, a relatively small amount of jitter in the ATM network may generate a significantly larger amount of jitter when the ATM packet data is reconverted to MPEG data form and sent out to the individual STBs in the system. In particular the individual rate buffers (at the receiver locations), which are required to supply a constant bit rate of information to the decoders, need to be large to accommodate the maximum jitter or delay expected in the MPEG data supplied thereto.

The present invention minimizes the jitter magnification problem with the result that the rate buffers for the individual STBs can be smaller.

OBJECTS OF THE INVENTION

A principal object of the invention is to provide a novel ATM/MPEG system.

A further object of the invention is to minimize the effects of multiplex jitter in an ATM/MPEG system.

A still further object of the invention is to provide a cost effective VSB receiver for receiving data via an ATM/MPEG link.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
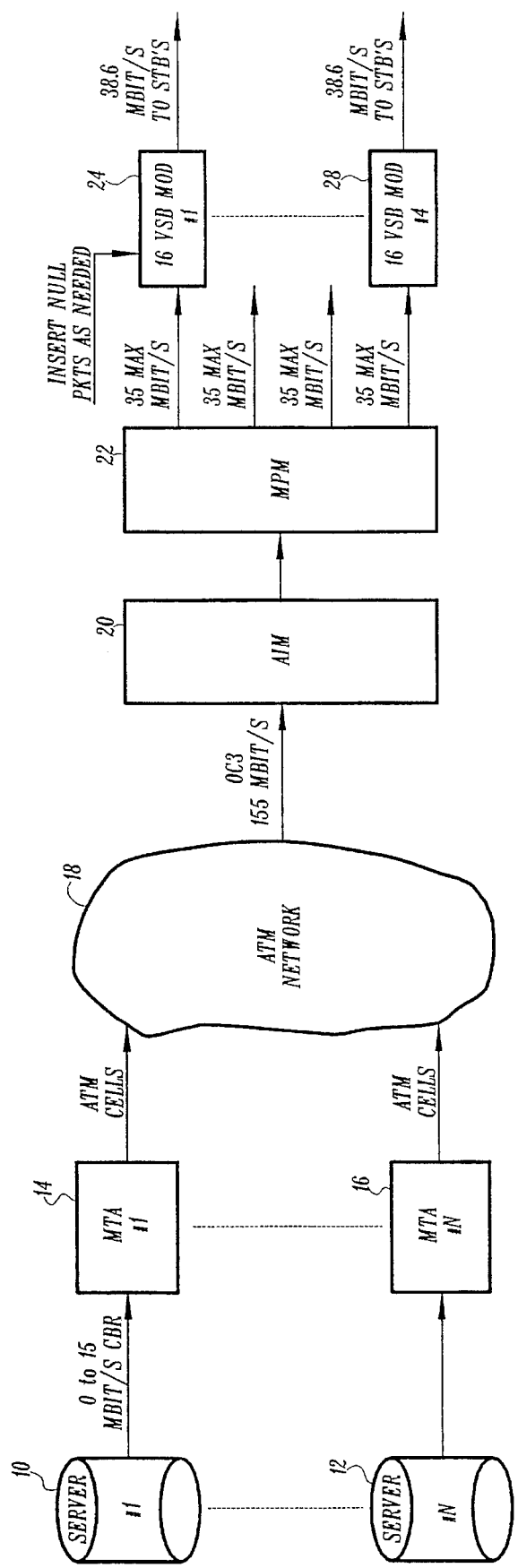
FIG. 1 is a generalized block diagram of an ATM/MPEG conversion system.

Referring to FIG. 1, representative servers 10 and 12 indicate that any number of servers from 1 to N may be used depending upon the constraints of the MPEG and ATM networks. As mentioned, the MPEG 2 digital video (also audio and data services) is supplied from servers via an ATM link to a 16 VSB transmitter site. The servers individually have a constant bit rate that may range from 0 to 15 megabits per second and an ATM network constant bit rate of 155 megabits per second. Since the servers are constrained to transmit single MPEG programs, each program requires an individual server. The servers output their MPEG programs at predetermined selected bit rates to corresponding MTA (MPEG TO ATM) converters 14 and 16, respectively. As will be seen in FIG. 2, the MTAs reformat the MPEG 2 data into ATM cells which are supplied to the ATM network 18 and sent out as multiplexed ATM data packets at a constant bit rate. The multiplexed ATM data packets are received by the ATM interface module, AIM 20. AIM 20 supplies an MPM (MPEG Processing Module) 22 that outputs four 35 maximum megabits per second MPEG signals to corresponding 16 VSB modulators 24–28. The modulators transmit corresponding output signals to a plurality of STBs.

Figure 2:
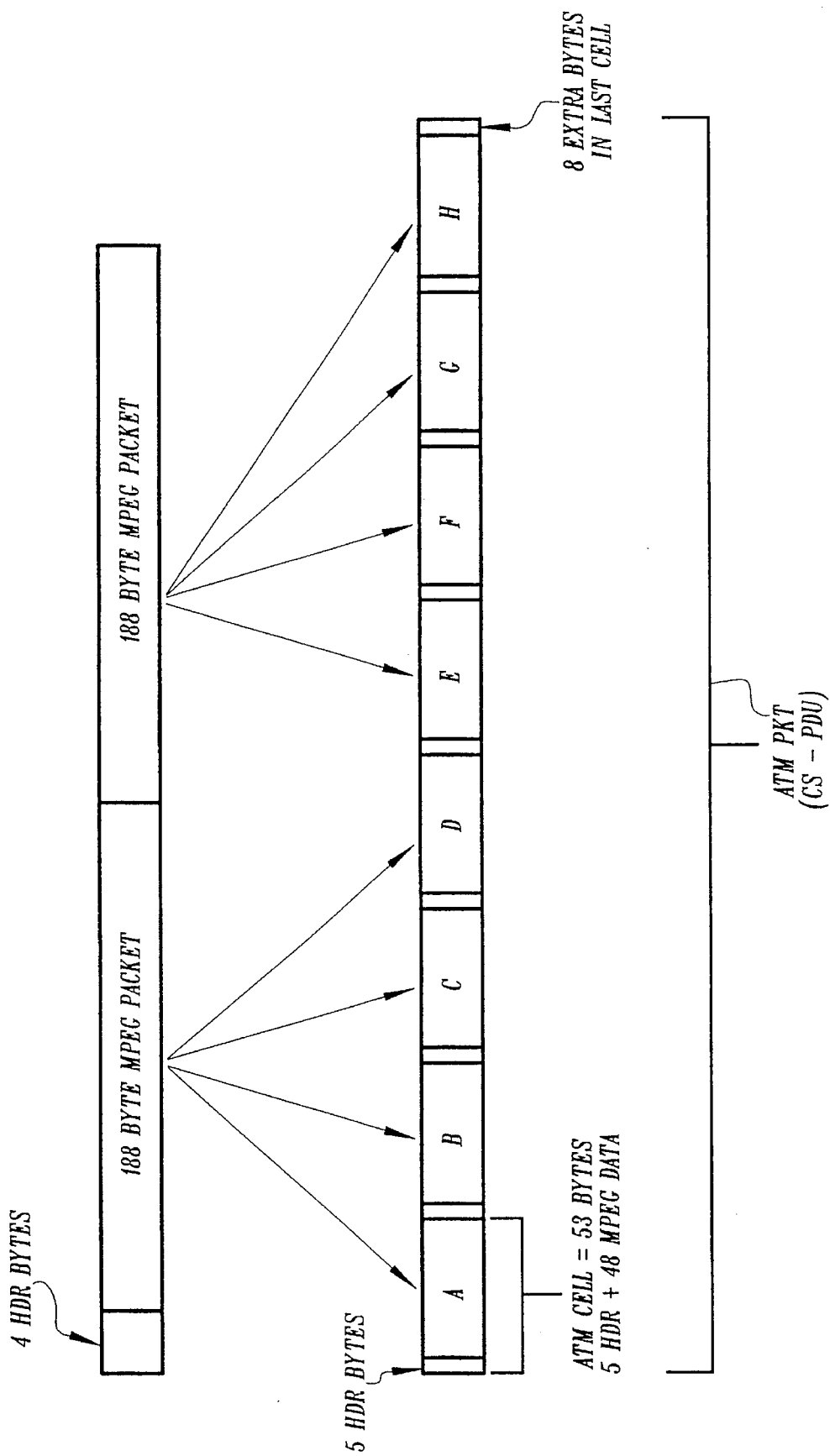
FIG. 2 illustrates the conversion of MPEG protocol to ATM protocol.

In FIG. 2, two 188 byte MPEG data packets, along with a four byte header, are shown as being formed into an ATM packet that consists of eight ATM cells of 53 bytes each labelled A, B, C, D, E, F, G and H. Each of the ATM cells includes a five byte header with the last cell also including eight extra bytes. The four byte header for the two MPEG packets includes information that identifies the program (server) from which the MPEG data originates. The pairs of MPEG 2 transport packets are converted into ATM packets by the MTA units 14 and 16 (FIG. 1). The ATM packets, which are technically identified as CS-PDU (Convergence Sublayer Protocol Data Unit) packets are referred to herein as ATM packets. Each ATM cell includes a five byte header that indicates the cell destination and the server or program that the cell is associated with. The remaining 48 bytes of each cell include portions of one of the two MPEG data packets. The eight extra bytes at the end of the ATM packet may be used for error checking or other purposes. The individual ATM cells are sent over the ATM network. These ATM cells, along with cells from the other servers, are multiplexed over the network to the same or to different 16 VSB transmitter sites. At the transmitter site, the AIM 20 receives the multiplexed ATM cells from a number of different servers. As mentioned, the ATM network guarantees that cells from the same server will remain in their original order although the cells are intermixed with cells from other servers.

Figure 3:
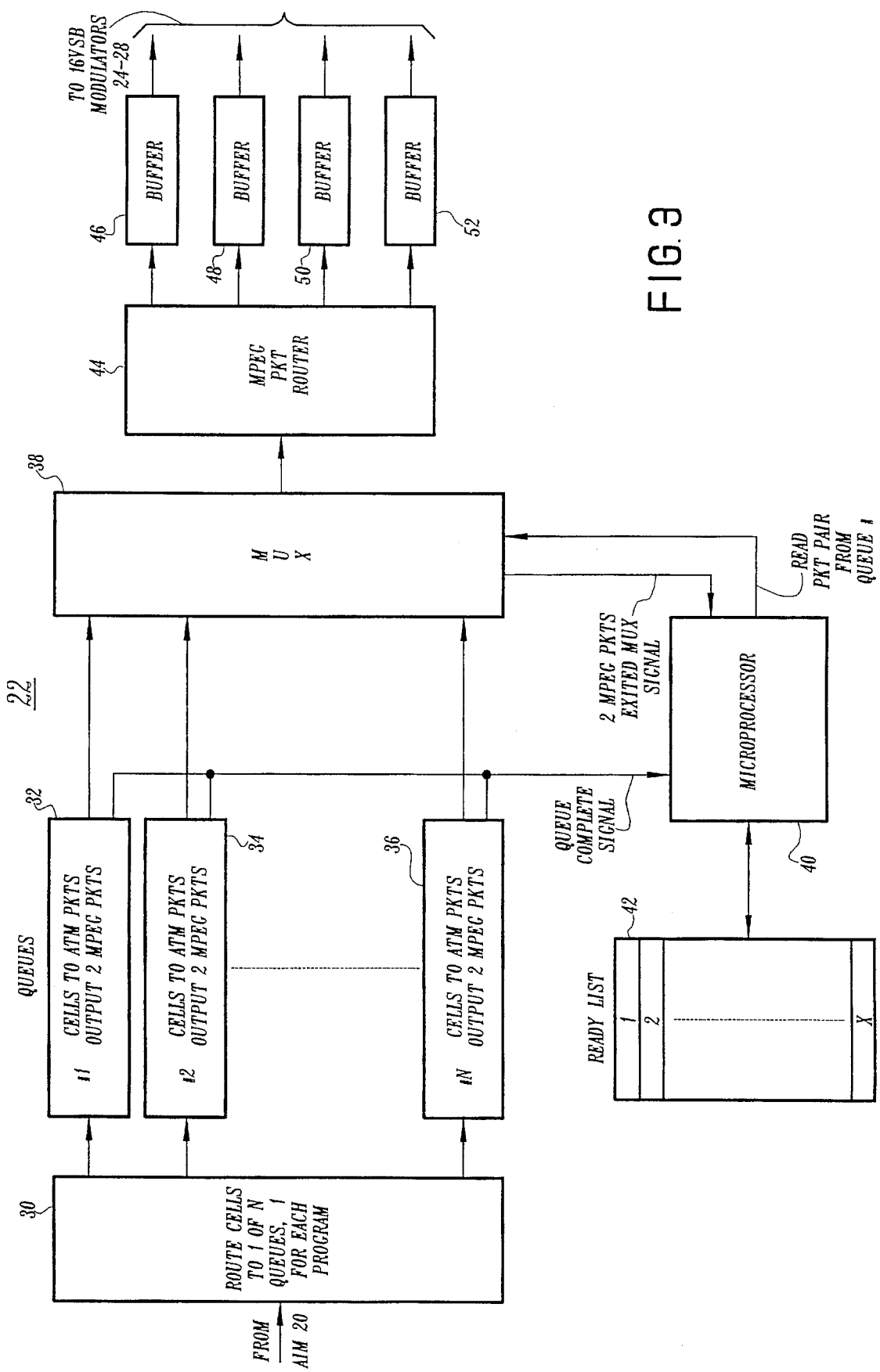
FIG. 3 is an enlarged detailed view of the MPM 22 of FIG. 1.

FIG. 3 shows details of MPM 22 of FIG. 1. The ATM cells from AIM 20 are supplied to a cell router 30 which is coupled to a plurality of queues 32, 34 . . . 36, corresponding to one queue for each server used. The queues are numbered from 1–N and correspond to the programs from servers numbered 1–N, which programs, it will be recalled, are identified in the cell headers. A straightforward approach to reassembly of the two MPEG data packets would be to read the data from the queue to the multiplexer 38 whenever the H cell of an ATM data packet has been received into the particular queue. Multiplexer 38 is under control of a microprocessor 40 that is supplied with a Queue Complete signal from the queues and with a 2 MPEG Packets Exited Mux signal when the two MPEG packets exit the multiplexer 38. Microprocessor 40, in accordance with the invention, establishes a ready list 42 within its memory that identifies the queues according to a predetermined priority such as 1, 2, 3, . . . X. As will be seen, these priorities are established in accordance with the bit rates of the programs from the individual servers.

Multiplexer 38 in turn supplies an MPEG packet router 44 which demultiplexes the MPEG packets into one of four buffers 46, 48, 50 and 52 based upon program identifying data in the MPEG header and a local map that routes up to 32 different programs to each of the four 16 VSB modulators. Each of the four buffer outputs can be up to a maximum of 38.6 megabits per second. Noting that in FIG. 1 that the ATM network outputs a constant 155 megabits per second data stream, after deleting the cell headers this becomes 48÷53×155=140 megabits per second for MPEG packet data. This is adequate to provide four streams of up to 35 megabits per second, to each 16 VSB modulator. As is indicated in FIG. 1, each 16 VSB modulator inserts null or auxiliary MPEG packets into its bit stream to fill out the rate to 38.6 megabits per second.

Figure 4:
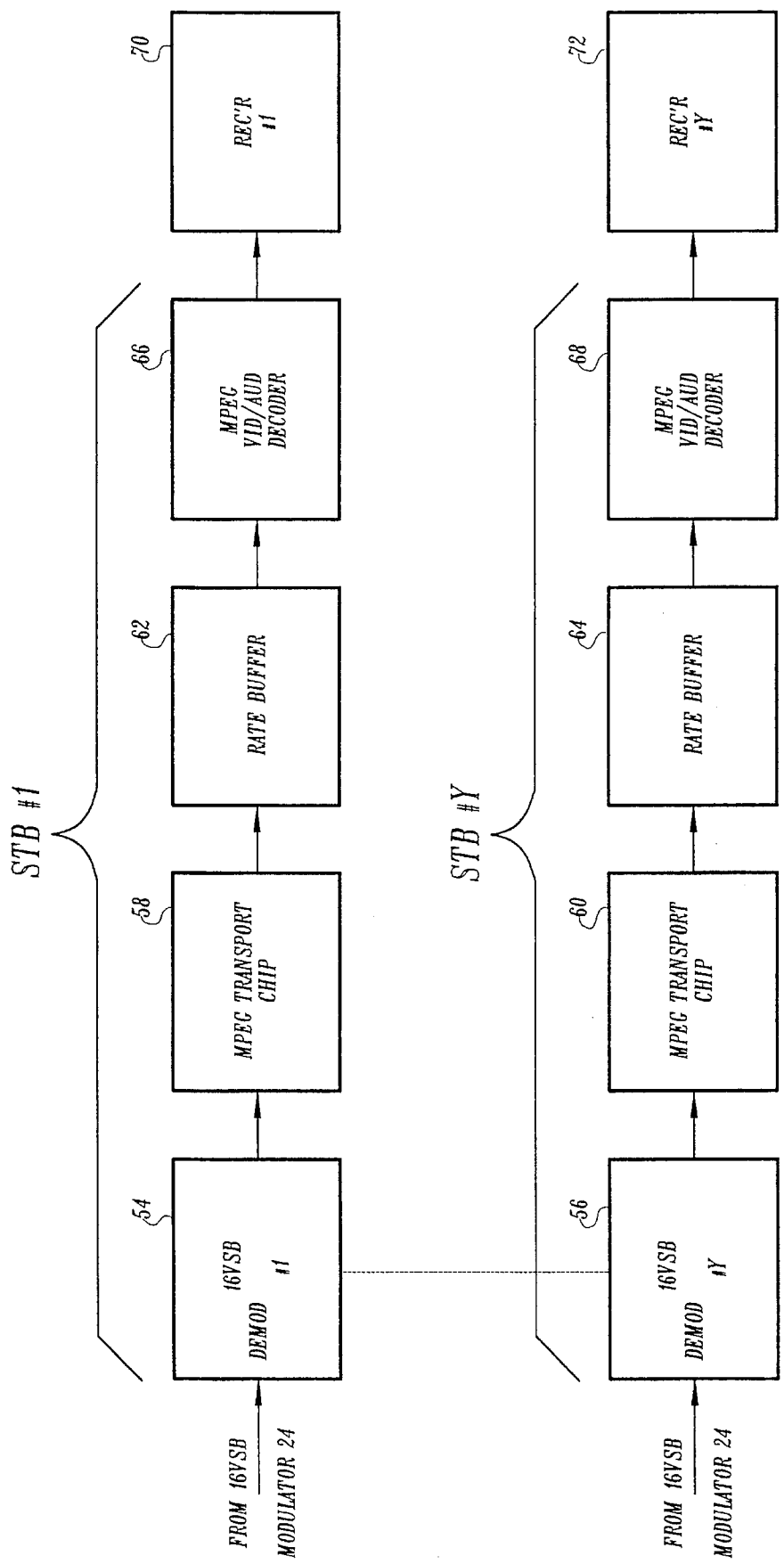
FIG. 4 is a block diagram of the set top boxes utilized in conjunction with the receivers in the cable system.

In FIG. 4, each STB receives, from one of the VSB modulators, a constant rate 38.6 megabits per second data stream consisting of MPEG packets from up to 32 programs. The STB No. 1, for example, includes a 16 VSB demodulator 54 coupled to an MPEG transport chip 58 which in turn is supplied to a rate buffer 62 that is coupled to an MPEG video/audio decoder 66. The decoder 66 outputs a signal to a receiver 70. An STB No. Y is illustrated with 16 VSB demodulator 56, a transport chip 60, a rate buffer 64, a decoder 68 and a receiver 72. The MPEG transport chips 58, 59 select MPEG packets for a single program and pass these packets to respective rate buffers 62, 64. The smoothing buffers are required because the MPEG decoders 66, 68 must have a constant bit rate input stream. The size of the rate buffers 62, 68 is thus a function of the amount of jitter or delay variation that the MPEG packet incurred during its trip from the server to the STB and the bit rate of the particular program. Obviously a higher bit rate program will require a larger rate buffer than a lower bit rate program, given the same amount of jitter or delay variation in the network. It is therefore extremely important to minimize this jitter, especially for high bit rate programs. Consider also that a rate buffer is used in each STB, which corresponds to each subscriber location. The rate buffer cost is of great importance because the rate buffers are used throughout the cable plant.

Ideally, the ATM network will introduce no time jitter into the constant bit rate data stream produced by each of the servers. For example, assume a 15 megabits per second constant bit rate from server No. 1 and for simplicity assume that the AIM block 20 receives a 150 megabits per second data stream from the network. If the ATM network produces no jitter, then every tenth cell will be from server No. 1 with exactly nine cells from the other servers in between. In reality, the ATM network does introduce time jitter. On average, every tenth cell will be from server No. 1, but any individual cell may be dispersed in time by a worst case maximum amount that should be specified by the ATM system provider. This maximum amount is generally specified as ±1 millisecond. (It will be noted that despite any time displacement or jitter, cells from a given server will always remain in their original order.)

The process of MPEG data packet demultiplexing, reassembly and remultiplexing that occurs in MPM 22 can magnify the jitter or delay variation that occurs over the ATM network. A near worst case example is explained as follows: assume that there are 91 servers or programs being sent to the transmitter site over an ATM network that runs at exactly 150 megabits per second. These servers are designated 1–91. Let the ATM cells for each ATM packet for program (server) 1 be designated 1A, 1B, 1C, 1D, 1E, 1F, 1G and 1H. A program 2 ATM packet will consist of cells 2A, 2B . . . 2H. For program 91, the cells are identified as 91A, 91B . . . 91H. Assume also that the server for program 91 delivers data at a high constant bit rate of 15 megabits per second whereas the servers for programs 1–90 each deliver data at a much lower constant bit rate of 1.51 megabits per second. A near ideal cell multiplex, as received from the ATM network where cell frequency matches the relative program bit rates, could in the worst case scenario look like the following sequence.

91G, 1H, 2H, 3H, 4H, 5H, 6H, 7H, 8H, 9H, 91H, 10H, 11H, 12H,
13H, 14H, 15H, 16H, 17H, 18H, 91A, 19H, 20H . . . 27H,
91B . . . 91H, 82H, 83H, 84H . . . 88H, 89H, 90H, 91A . . .

Note that the cells for program No. 91 occur ten times more frequently than the cells for the other services, this being in proportion to the relative bit rates. Note also that in this hypothetical example all of the slow speed programs have their "H" cells phased together. While this is unlikely, it is not impossible and contributes to the worst case scenario.

Now assume that the ATM network causes the first 91H cell to be jittered late by 255 microseconds. At a 150 megabits per second rate, this causes a displacement of about 90 cells so the result is 91G, 1H, 2H, 3H, 4H, 5H, 6H, 7H, 8H, 9H, 10H, 11H, 12H, 13H, 14H, 15H, 16H, 17H, 18H, 19H, 20H . . . 27H . . . 82H, 83H, 84H . . . 88H, 89H, 90H, 91H . . .

Had the 91H cell arrived in its unjittered position, the ATM packet of which it is a part would have been completed at that time. The ATM packet would have been read out of the queue to the multiplexer 38 as soon as any previously completed ATM packet for another server exited multiplexer 38. Because the 255 microsecond ATM jitter causes a 90 cell delay, and because all 90 of the servers happen to have their "H" cells phased together and they all are thus completing their ATM packets at the same time, a delay is required until all 90 MPEG packet pairs for the low speed servers or programs are read out of their respective queues at 150 megabits per second. This effectively multiplies the ATM jitter by a factor of eight resulting in a large jitter or delay of 2.04 milliseconds applied to the program 91 MPEG packets. Thus a relatively small 250 microsecond ATM jitter has been extended over 2 milliseconds. This greatly increases the required size of the rate smoothing buffer in the STB.

In accordance with the invention as shown in FIG. 3, instead of reading out the ATM packets from their respective program queues in the order of completion, a priority is assigned to each queue based upon the bit rate of the program (server) that the queue is serving. The highest bit rate program that has a completed ATM packet is read out first. In the example above, when cell 91H arrives, its ATM packet is read out as soon as the current ATM packet that is being read out of the multiplexer 38 is finished even though ATM packets from lower bit rate services have completed earlier and are waiting to be read out. The first to complete rule is followed in reading out the 90 lower bit rate services, since their bit rates are equal. The system of the invention reduces jitter for the higher bit rate programs by guarding against an unfortunate cell phasing of a number of lower speed programs from delaying the exit of completed higher speed program ATM packets from multiplexer 38. In this situation, some of the lower bit rate services will suffer a large reassembly jitter (which is made slightly worse with the invention), but this is much less critical than with high bit rate services.

Returning to FIG. 3, at initialization each of the queues (32–36) is assigned a priority level from 1 to X, with 1 being the highest priority and X being the number of different bit rates the servers are providing. The priority level is based upon the bit rate of the program assigned to the queue. Multiple queues may share the same priority level if they are used with programs having the same (or nearly the same) bit rate. The microprocessor 40 creates in its memory a ready list 42 for each priority level. Whenever an H cell arrives for a program, indicating completion of an ATM packet, the microprocessor receives a Queue Complete signal and writes the queue number into ready list 42 for that queue's priority level. This process continues as the ATM cells arrive. The microprocessor is also interrupted whenever an MPEG packet pair has exited multiplexer 38. The microprocessor then checks ready list 42 in priority level order and finds the highest priority non-empty ready list. It then reads the next queue number on the list and tells multiplexer 38 to read in that queue's next (already completed) MPEG packet pair. When only a single program is assigned to a given priority level, its queue number will be the only one that is ever written to that priority level's ready list. Multiple programs with the same bit rate share the same priority level and are handled on a first come, first serve basis since that is the way the queue numbers would be written into their shared ready list.

What has been described is a novel ATM/MPEG multiplexer system that minimizes the effects of jitter in the ATM network. It is recognized that numerous changes in the described embodiment of the invention will be apparent to those skilled in the art without departing from its true spirit and scope. The invention is to be limited only as defined in the claims.

What is claimed is:

1. A method of reducing multiplex jitter in an ATM/MPEG system comprising:

multiplexing MPEG transport data packets of individual programs having different constant bit rates to ATM cells having a constant bit rate;

receiving the ATM cells;

demultiplexing the ATM cells into queues of the individual programs;

assigning priorities to the queues based upon the bit rates of the individual programs; and loading the queued individual programs into buffers based upon the assigned priorities.

2. The method of claim 1 further comprising multiplexing the queued individual programs and routing them to individual modulators; and decoding the individual programs.

3. The method of claim 1 wherein the assigning further comprises developing a ready list in a microprocessor for the different individual program bit rates and further including;

signalling completion of each queue to the microprocessor; and signalling the microprocessor upon completion of the loading of each queue in the buffers.

4. The method of claim 1 wherein the individual programs are represented by corresponding servers and wherein two MPEG 2 transport data packets are included in each ATM packet, which consists of eight ATM cells, and wherein each of the buffers serves a 16 VSB modulator.

5. A method of reducing multiplex jitter in an ATM/MPEG system comprising:

multiplexing MPEG transport data packets of individual programs having different constant bit rates to ATM cells having a constant bit rate;

receiving the ATM cells;

demultiplexing the ATM cells into queues of said individual programs;

developing a priority ready list for the queues based upon the bit rates of the individual programs;

multiplexing the queued individual programs into buffers based upon the priority ready list;

signalling completion of each queue;

signalling completion of the loading of each queue in one of the buffers; and supplying the individual programs in the buffers to individual modulators.

6. The method of claim 5 wherein the individual programs are represented by corresponding servers and wherein two MPEG 2 transport data packets are included in each ATM packet, which consists of eight ATM cells, and wherein each buffer serves a 16 VSB modulator.

7. An ATM/MPEG system:

means for generating MPEG transport data packets representing individual programs of different constant bit rates;

means for multiplexing said MPEG transport data packets to ATM cells;

means for transmitting said ATM cells at a constant bit rate;

means for receiving said ATM cells;

demultiplexing means for demultiplexing said ATM cells into queues of said individual programs;

means for assigning priority to said queues based upon the bit rates of said individual programs;

a plurality of buffers; and means for loading said queues into said plurality of buffers based upon their assigned priorities.

8. The system of claim 7 further including a plurality of individual modulators;

means for multiplexing said queues among said individual modulators; and means for receiving and decoding said individual programs received from said individual modulators.

9. The system of claim 8 wherein said priority assigning means comprises:

a microprocessor;

means for developing a ready list for said different constant bit rates;

means for signalling said microprocessor upon completion of each said queue; and means for signalling said microprocessor upon completion of loading of each said queue to one of said buffers.

10. The system of claim 9 wherein the individual programs are represented by corresponding servers and wherein two MPEG 2 transport data packets are included in each ATM packet, which consists of eight ATM cells, and wherein each buffer serves a 16 VSB modulator.

11. An ATM/MPEG system:

means for generating MPEG transport data packets representing individual programs of different constant bit rates;

means for multiplexing said MPEG transport data packets to ATM cells;

means for transmitting said ATM cells at a constant bit rate;

means for receiving said ATM cells;

demultiplexing means for demultiplexing said ATM cells into queues of said individual programs;

a microprocessor;

means for developing a priority ready list for said queues based upon said different bit rates;

means for signalling said microprocessor upon completion of each said queue;

a plurality of buffers;

a plurality of individual modulators;

means for loading said queues into said buffers based upon their assigned priorities;

means for signalling said microprocessor upon completion of loading of each said queue to one of said buffers; and means for coupling said queues to said individual modulators.

12. The system of claim 11 wherein said individual programs are represented by corresponding servers and wherein two MPEG 2 transport data packets are included in each ATM packet, which consists of eight ATM cells, and wherein each buffer serves a 16 VSB modulator.

* * * * *